United States Patent
Rodriguez et al.

(10) Patent No.: US 6,612,609 B1
(45) Date of Patent: Sep. 2, 2003

(54) INFLATABLE AIR BAG WITH INNER BAG AND OUTER BAG

(75) Inventors: Alberto Rodriguez, Rochester Hills, MI (US); Hector Javier Zarazua Mauleon, Rochester Hills, MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 0 days.

(21) Appl. No.: 09/690,429

(22) Filed: Oct. 17, 2000

(51) Int. Cl.$^7$ .............................................. B60R 21/24
(52) U.S. Cl. .................................... 280/729; 280/743.1
(58) Field of Search ................................ 280/729, 731, 280/732, 730.1, 743.1, 743.2, 728.1; 493/405

(56) References Cited

U.S. PATENT DOCUMENTS

| | | | |
|---|---|---|---|
| 4,006,918 A | | 2/1977 | MacFarland ................. 280/729 |
| 5,249,824 A | | 10/1993 | Swann et al. ................ 280/729 |
| 5,435,594 A | * | 7/1995 | Gille ......................... 280/728.2 |
| 5,607,182 A | * | 3/1997 | Nelsen et al. ............. 280/743.1 |
| 5,615,915 A | * | 4/1997 | Magoteaux ................ 280/743.1 |
| 5,836,612 A | | 11/1998 | Lang ........................ 280/743.1 |
| 5,899,495 A | * | 5/1999 | Yamamoto et al. ........ 280/743.1 |
| 5,913,535 A | | 6/1999 | Taguchi et al. ............... 280/729 |
| 5,957,485 A | * | 9/1999 | Hirai ........................... 280/729 |
| 6,017,054 A | * | 1/2000 | Magoteaux ................ 280/728.2 |
| 6,029,992 A | * | 2/2000 | Vendely et al. ............. 280/728.2 |
| 6,042,147 A | * | 3/2000 | Nishijima et al. .......... 280/743.1 |
| 6,086,092 A | * | 7/2000 | Hill ............................. 280/729 |
| 6,092,839 A | * | 7/2000 | Nagano ..................... 280/743.1 |
| 6,209,911 B1 | * | 4/2001 | Igawa et al. .................. 280/740 |
| 6,224,101 B1 | * | 5/2001 | Nishijima et al. .......... 280/743.2 |
| 6,241,283 B1 | * | 6/2001 | Zarazua ..................... 280/743.2 |
| 6,247,727 B1 | * | 6/2001 | Hamada et al. ............ 280/743.2 |
| 6,382,662 B1 | * | 5/2002 | Igawa ........................... 280/729 |

FOREIGN PATENT DOCUMENTS

DE    198 58 690 A1    6/2000

OTHER PUBLICATIONS

Co-pending U.S. patent Appln. Ser. No. 09/504,481, filed Feb. 15, 2000 entitled "Inflatable Air Bag".

* cited by examiner

Primary Examiner—Paul N. Dickson
Assistant Examiner—Laura B. Rosenberg
(74) Attorney, Agent, or Firm—Tarolli, Sundheim, Covell & Tummino L.L.P.

(57) ABSTRACT

A vehicle air bag (10) comprises an outer bag (50) having an inflation fluid volume (59). The outer bag (50) has a retainer portion (54) defining a central opening (56). The retainer portion (54) has a plurality of fastener openings (58) spaced apart around the central opening (56). An inner bag (60) is located in the inflation fluid volume (59) of the outer bag (50). The inner bag (60) has a retainer portion (110) defining an inflation fluid opening (114) for receiving inflation fluid. The retainer portion (110) has a plurality of fastener openings (79, 89, 99, 109) spaced apart around the inflation fluid opening (114). The inner bag (60) has at least one vent opening (130–136) movable from a closed condition to an open condition, in response to increase in fluid pressure in the inner bag, to enable flow of inflation fluid from the inner bag into the inflation fluid volume (59) of the outer bag (50). The air bag (10) further comprises a plurality of fasteners (32–38) extending through the fastener openings (58) in the retainer portion (54) and through the fastener openings (79, 89, 99, 109) in the retainer portion (110) to secure the inner bag to the outer bag without sewing. The retainer portion (54) is free of stitching openings.

21 Claims, 3 Drawing Sheets

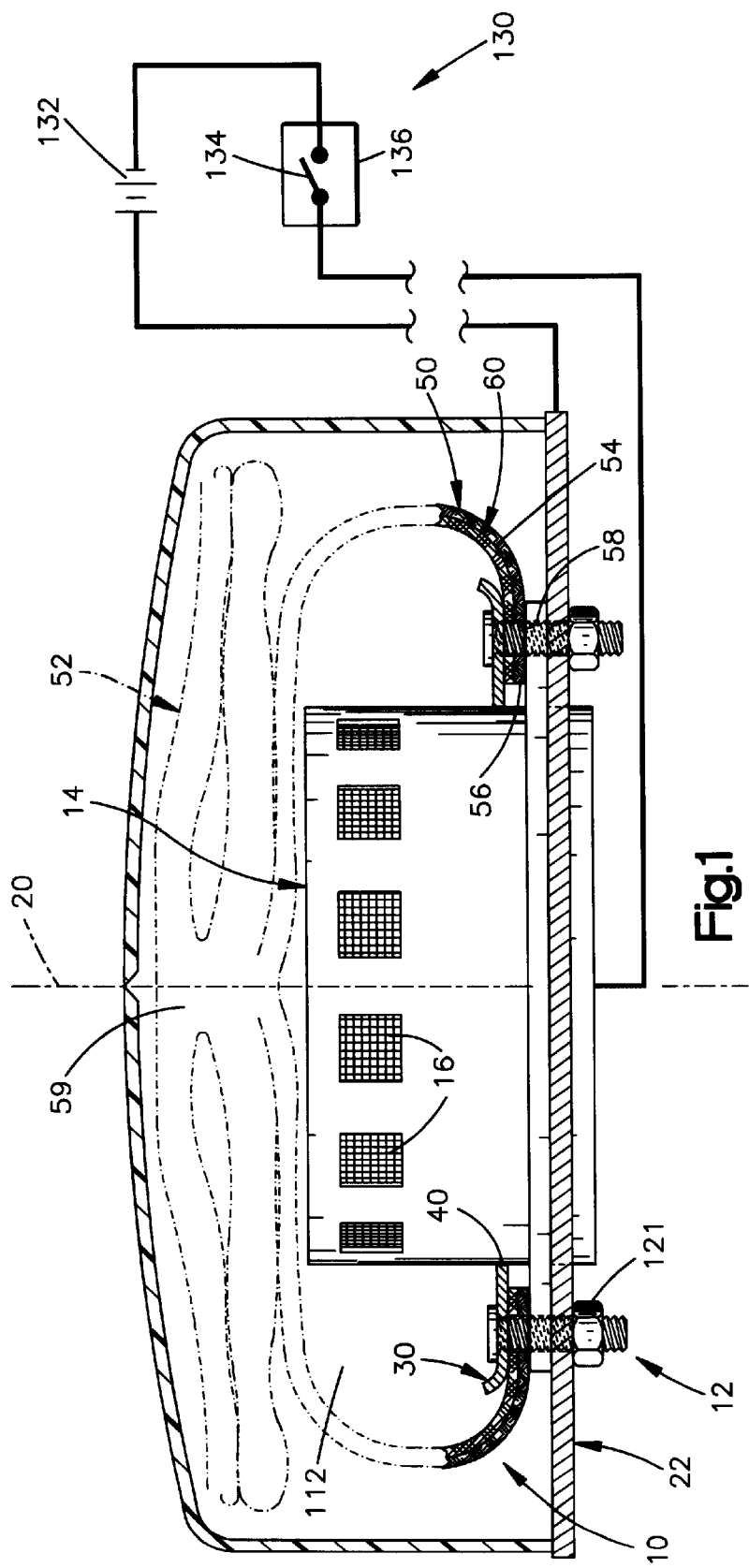

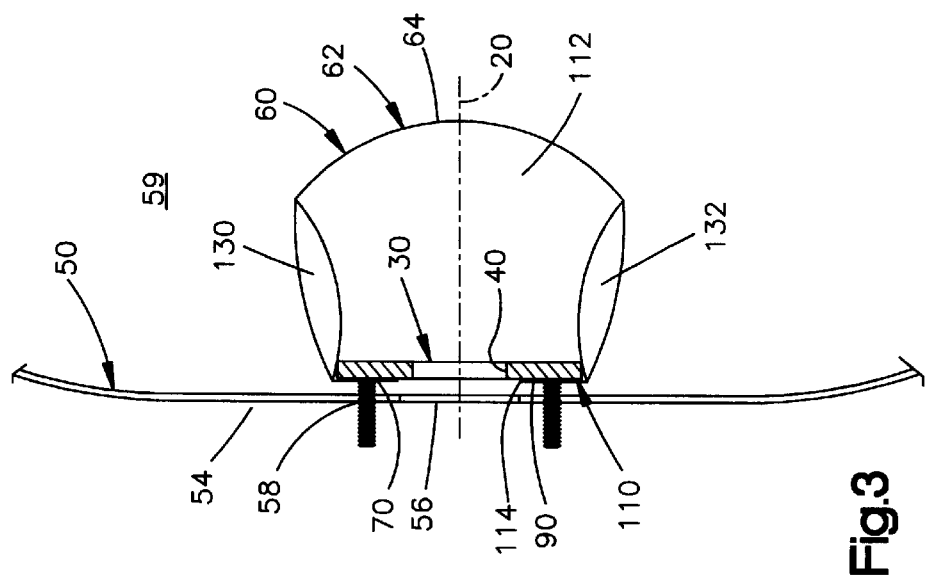
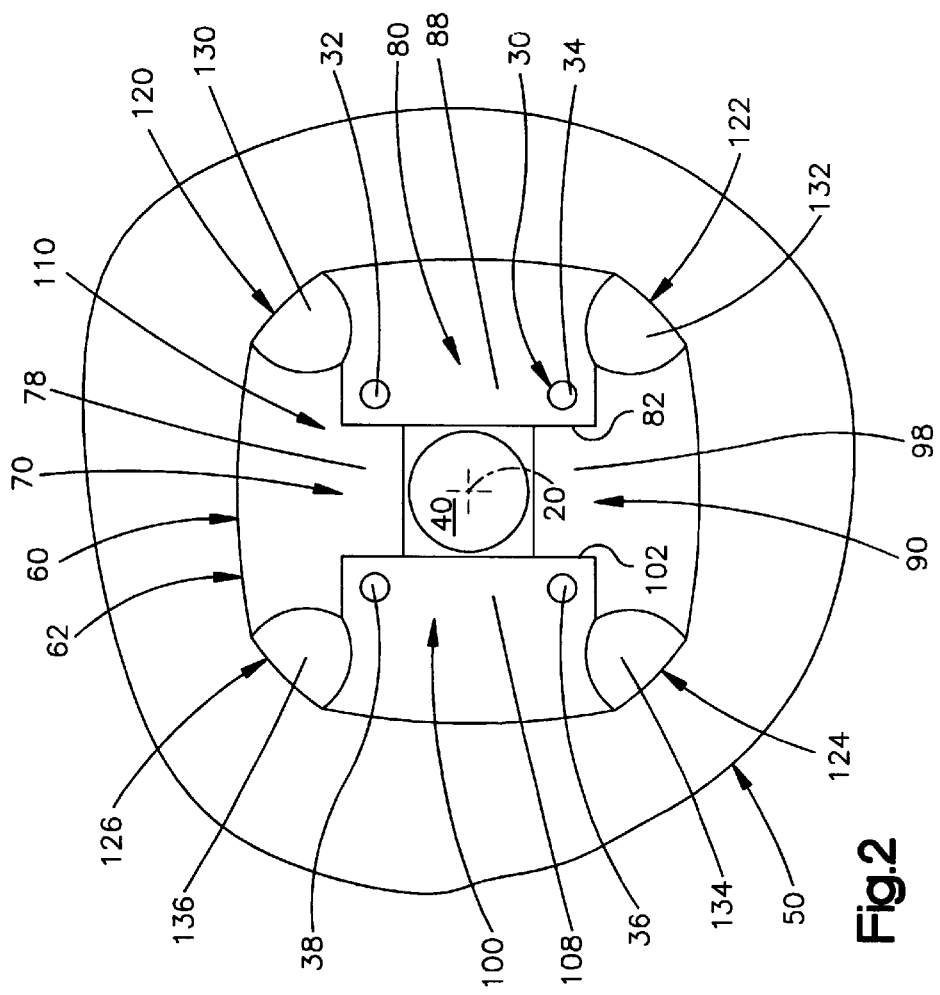

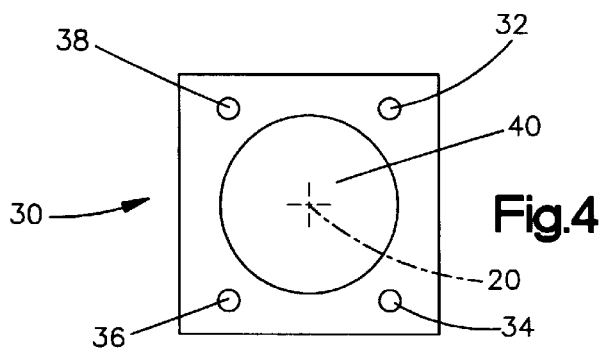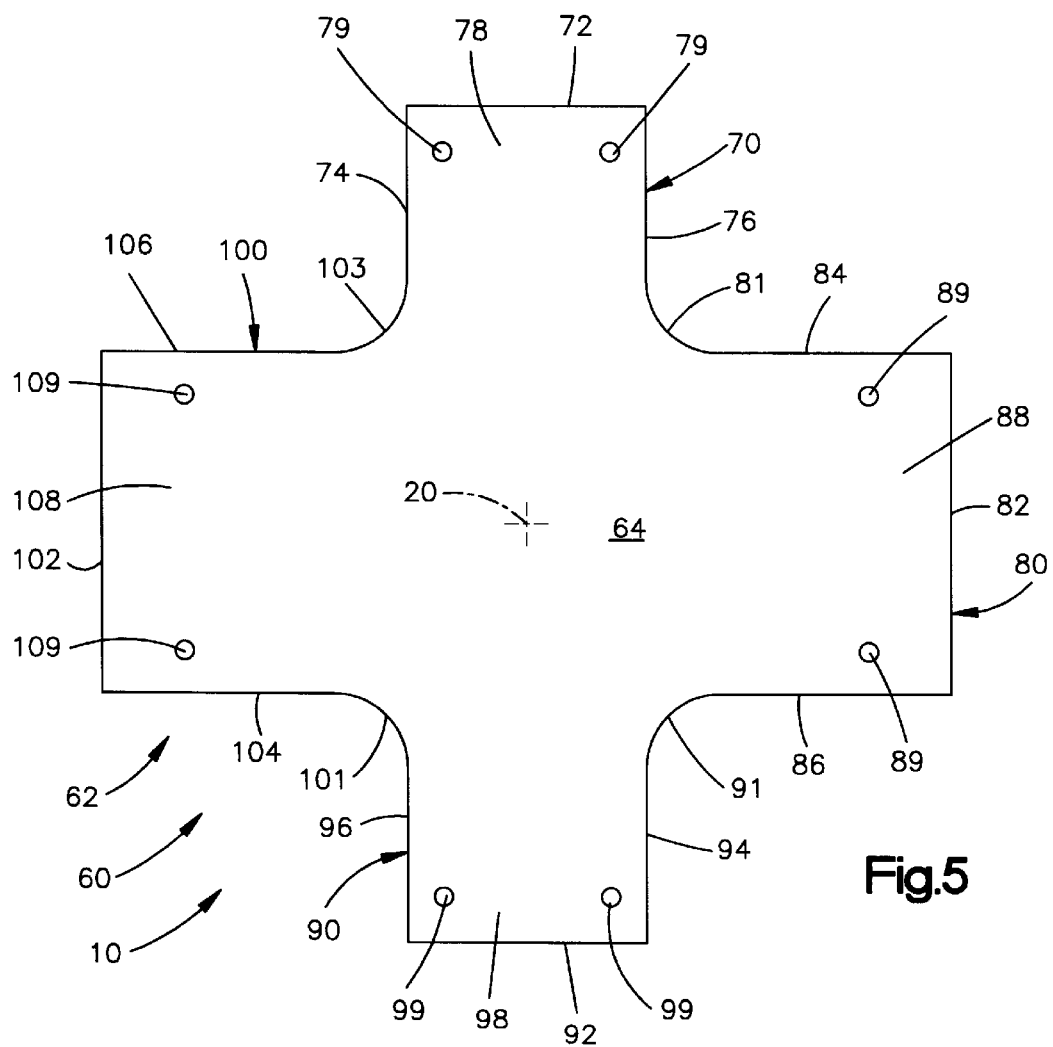

INFLATABLE AIR BAG WITH INNER BAG AND OUTER BAG

BACKGROUND OF THE INVENTION

1. Technical Field

The present invention relates to an inflatable air bag having an inner bag that defines an inflation fluid volume inside an outer bag.

2. Description Of The Prior Art

U.S. Pat. No. 5,249,824 discloses an air bag including an expansible inner bag that is located in an internal fluid cavity of an outer bag. The inner and outer bags are sewn to each other at the mouth portion of the air bag, surrounding the inflation fluid opening. The inner bag has a plurality of vent openings for directing inflation fluid from the inner bag into the internal cavity of the outer bag in a direction away from the occupant impact area.

SUMMARY OF THE INVENTION

The present invention is a vehicle air bag comprising an outer bag having an inflation fluid volume and being inflatable to a predetermined configuration when inflation fluid is directed into the outer bag. The outer bag has a retainer portion defining a central opening. The retainer portion of the outer bag has a plurality of fastener openings spaced apart around the central opening of the retainer portion.

An inner bag is located in the inflation fluid volume of the outer bag and is inflatable to a predetermined configuration within the inflation fluid volume when inflation fluid is directed into the inner bag. The inner bag has a retainer portion defining an inflation fluid opening for receiving inflation fluid. The retainer portion of the inner bag has a plurality of fastener openings spaced apart around the inflation fluid opening of the retainer portion of the inner bag. The inner bag has at least one vent opening movable from a closed condition to an open condition, in response to increase in fluid pressure in the inner bag, to enable flow of inflation fluid from the inner bag into the inflation fluid volume of the outer bag.

The air bag assembly further comprises a plurality of fasteners extending through the fastener openings in the retainer portion of the outer bag and through the fastener openings in the retainer portion of the inner bag to secure the inner bag to the outer bag without sewing. The retainer portion of the outer bag is free of stitching openings.

BRIEF DESCRIPTION OF THE DRAWINGS

The foregoing and other features of the present invention will become apparent to one skilled in the art to which the present invention relates upon consideration of the following description-of the invention with reference to the accompanying drawings, in which:

FIG. 1 is a schematic illustration, partly in section, of an air bag module including an air bag constructed in accordance with the present invention;

FIG. 2 is a schematic bottom plan view of portions of the air bag module of FIG. 1;

FIG. 3 is a schematic side view of portions of the air bag module of FIG. 1, showing the air bag in an inflated condition;

FIG. 4 is a bottom plan view of a retainer that forms part of the air bag module of FIG. 1; and FIG. 5 is a plan view of an inner bag that forms part of the air bag of FIG. 1.

DESCRIPTION OF THE INVENTION

The present invention relates to an inflatable vehicle occupant protection device, such as an air bag. In particular, the present invention relates to an air bag having an inner bag that defines an inflation fluid volume inside an outer bag. As representative of the present invention, FIGS. 1–5 illustrate an air bag 10. Other inflatable vehicle occupant protection devices that can be used in accordance with the invention include, for example, inflatable seat belts, inflatable knee bolsters, inflatable head liners, inflatable side curtains, and knee bolsters operated by inflatable air bags.

The air bag 10 (FIG. 1) forms a part of a driver side air bag module 12. The module 12 includes an inflator 14 of a cylindrical configuration having a plurality of inflation fluid outlets 16 disposed in a circular array around an axis 20 of the module. The module 12 also includes a mounting plate 22 for securing the module to the steering wheel (not shown) of the vehicle.

The module includes a retainer 30 for securing the inflator 14 and the air bag 10 to the mounting plate 22. The retainer 30 includes a plurality of fasteners in the form of threaded studs. In the illustrated embodiment, four studs 32, 34, 36 and 38 (FIG. 4) are provided, in an array centered on the axis 20. The retainer 30 has a generally rectangular configuration including a circular central opening 40 that receives the inflator 14.

The air bag 10 (FIG. 2) includes an outer bag 50 and an inner bag 60 that are associated with each other, in a manner described below, to form the completed air bag 10. The outer bag 50 is of a known, pillow-shaped configuration and comprises an outer panel 52 (sometimes called a "front panel") that is engageable by the vehicle occupant when the air bag 10 is inflated.

The outer bag 50 has a retainer portion 54 defining a central opening or inflation fluid opening 56 of the outer bag. The retainer portion 54 of the outer bag 50 has a plurality of fastener openings 58 spaced apart around the inflation fluid opening 56. The outer bag 50 has an inflation fluid volume 59.

The inner bag 60 comprises an inner panel 62. The inner panel 62 is a single sheet of flexible fabric material having a cross-shaped or cruciform configuration, as shown in FIG. 5. The inner panel 62 could, alternatively, be made from more than one piece of material sewn or otherwise joined together to form the inner panel.

The cruciform configuration of the inner panel 62 includes a central portion 64 and four arm portions 70, 80, 90 and 100. The first arm portion 70 is defined by an end edge 72 and two opposite side edges 74 and 76. The first arm portion 70 has an outer end portion 78 that includes the end edge 72 and a pair of fastener openings 79 adjacent the end edge.

The second arm portion 80 is defined by an end edge 82 and two opposite side edges 84 and 86. The second arm portion 80 has an outer end portion 88 that includes the end edge 82 and a pair of fastener openings 89 adjacent the end edge. A curved edge portion 81 extends between and interconnects the side edge 76 of the first arm portion 70 and the side edge 84 of the second arm portion 80.

The third arm portion 90 is defined by an end edge 92 and two opposite side edges 94 and 96. The third arm portion 90 has an outer end portion 98 that includes the end edge 92 and a pair of fastener openings 99 adjacent the end edge. A curved edge portion 91 extends between and interconnects the side edge 86 of the second arm portion 80 and the side edge 94 of the third arm portion 90.

The fourth arm portion 100 is defined by an end edge 102 and two opposite side edges 104 and 106. The fourth arm portion 100 has an outer end portion 108 that includes the end edge 102 and a pair of fastener openings 109 adjacent the end edge. A curved edge portion 101 extends between and interconnects the side edge 96 of the third arm portion 90 and the side edge 104 of the fourth arm portion 100. A curved edge portion 103 extends between and interconnects the side edge 106 of the fourth arm portion 100 and the side edge 74 of the first arm portion 70.

The inner bag 60 has a retainer portion 110 that comprises the four outer end portions 78, 88, 98 and 108 of the arm portions 70, 80, 90 and 100, respectively. Thus, the retainer portion 110 of the inner bag 60 includes the fastener openings 79, 89, 99 and 109 of the inner bag.

The inner panel 62 is assembled to the retainer 30 by placing the retainer in a position overlying the central portion 64 of the inner panel. Next, the four arm portions 70, 80, 90 and 100 of the inner panel 62 are folded over to at least partially overlie the retainer 30 and the central portion 64 of the inner panel, as shown in FIG. 2.

Specifically, the outer end portion 78 of the first arm portion 70 is folded over so that the fasteners 32 and 38 of the retainer 30 extend through the fastener openings 79 in the first arm portion. The outer end portion 98 of the opposite third arm portion 90 is folded over so that the remaining two fasteners 34 and 36 of the retainer 30 extend through the fastener openings 99 in the third arm portion.

The outer end portion 88 of the second arm portion 80 is folded over so that the fasteners 32 and 34 of the retainer 30 extend through the fastener openings 89 in the second arm portion. The outer end portion 108 of the fourth arm portion 100 is folded over so that the fasteners 36 and 38 of the retainer 30 extend through the fastener openings 109 in the fourth arm portion.

When the four arm portions 70, 80, 90 and 100 of the inner panel 62 are thus connected with the retainer 30, the inner panel forms the inner bag 60 of the air bag 10. The inner bag 60 defines an inflation fluid volume 112. The outer end portions 78, 88, 98 and 108 of the arm portions 70, 80, 90 and 100 of the inner panel 62 define an inflation fluid opening 114 of the inner bag 60. The inflation fluid opening 114 is in fluid communication with the inflation fluid volume 112 of the inner bag 60.

The inner bag 60 as thus configured has a generally rectangular configuration (in this case, square) including four corners 120, 122, 124 and 126. The inner bag 60 also has four fluid vents or vent openings 130, 132, 134 and 136. Each one of the vent openings 130–136 is located at a respective one of the corners 120–126 of the inner bag 60.

The first vent opening 130 is located at the corner 120 between the first and second arm portions 70 and 80. The second vent opening 132 is located at the corner 122 between the second and third arm portions 80 and 90. The third vent opening 134 is located at the corner 124 between the third and fourth arm portions 90 and 100. The fourth vent opening 136 is located at the corner 126 between the fourth and first arm portions 100 and 70. When the air bag 10 is deflated, the inner bag 60 is folded flat, and the vent openings 130-136 are substantially closed.

The subassembly of the inner bag 60 and the retainer 30 is assembled with the outer bag 50 as shown in FIGS. 1–3. The fasteners 32–38 of the retainer 30 extend through the fastener openings 58 in the retainer portion 54 of the outer bag 50. The inner bag 60 is located in the inflation fluid volume 59 of the outer bag 50.

The assembly of the outer bag 50, the inner bag 60, and the retainer 30 is then joined with the inflator 14 to form the module 12. When the assembled air bag 10 is secured in the module 12 (FIG. 1), the inflator outlets 16 are disposed within the inflation fluid volume 112 of the inner bag 60. Nuts 121 screwed onto the fasteners 32–38 secure the parts of the module 12 together.

The fasteners 32–38 and the nuts 121 clamp the retainer portion 110 of the inner bag 60 to the retainer portion 54 of the outer bag 50. The outer bag 50 is not sewn to the inner bag 60, thus eliminating a sewing step in manufacture of the air bag 10. There are no stitching openings in the retainer portion 54 of the outer bag 50, thus eliminating an area of possible fluid leakage from the air bag 10.

The inflator 14 is connected with vehicle electric circuitry 130 (FIG. 1) including a power source 132, which is preferably a vehicle battery and/or a capacitor, and a normally open switch 134. The switch 134 is part of a sensor 136 that senses a vehicle condition indicating the occurrence of a collision. The collision-indicating condition may comprise, for example, sudden vehicle deceleration that is caused by a collision. If the collision-indicating condition is at or above a predetermined threshold level, this indicates the occurrence of a crash having a level of severity for which it is desirable to inflate the air bag 10 or other vehicle occupant protection device to help protect an occupant of the vehicle.

When the sensor 136 senses a collision-indicating condition at or above the predetermined threshold level, the switch 134 closes and the inflator 14 is actuated electrically. The inflator outlets 16 direct inflation fluid into the inflation fluid volume 112 of the inner bag 60.

As inflation fluid fills the inner bag 60, the inner bag inflates to a condition as shown schematically in FIG. 3. The central portion 64 of the inner bag 60 moves away from the retainer portion 110 of the inner bag. As the inner bag 60 inflates, the vent openings 130–136 move from the closed condition to an open condition. Inflation fluid flows out of the inner bag 60 through the vent openings 130–136 in the inner bag. The inflation fluid flows outwardly away from the axis 20, into the inflation fluid volume 59 of the outer bag 50.

The inflation fluid that flows into the outer bag 50 through the vent openings 130–136 of the inner bag 60 is the only inflation fluid that flows into the outer bag. The outer bag 50 is inflated only with inflation fluid flowing from the inner bag 60 through the vent openings 130–136. The size and shape of the vent openings 130–136 in the inner bag 60 are controlled by the configuration of the arm portions 70, 80, 90 and 100 of the inner bag. The size and shape of the vent openings 130–136 can help to control the inflation of the outer bag 50.

From the above description of the invention, those skilled in the art will perceive improvements, changes and modifications in the invention. For example, the invention is also applicable to a passenger side air bag, which has a more rectangular configuration than the driver side air bag shown in the drawings. Such improvements, changes and modifications within the skill of the art are intended to be covered by the appended claims.

Having described the invention, we claim:

1. A vehicle air bag comprising:
   an outer bag having an inflation fluid volume, said outer bag comprising a central inflation fluid opening and a plurality of fastener openings spaced around said inflation fluid opening;

an inner bag located in said inflation fluid volume of said outer bag, said inner bag being made from a single piece of flexible material comprising a central portion and four arm portions extending from said central portion in a cross-shaped configuration, each of said arm portions including a pair of spaced fastener openings;

said inner bag having a folded condition wherein said arm portions are folded relative to said central portion such that adjacent ones of said arm portions at least partially overlie each other, said fastener openings of said overlying arm portions being aligned with each other, not more than two of said arm portions overlying each other at any location on said arm portions;

said arm portions defining an inflation fluid opening of said inner bag when said inner bag is in said folded condition, said inflation fluid opening having a periphery defined by outer edge portions of said arm portions, said inflation fluid opening of said inner bag overlying said inflation fluid opening of said outer bag, said overlying fastener openings of said inner bag being aligned with a respective one of said fastener openings in said outer bag;

said air bag further comprising a plurality of fasteners extending through said aligned fastener openings in said outer bag and said inner bag to secure said inner bag to said outer bag.

2. An air bag as set forth in claim 1 wherein said fasteners are mounting studs on a retainer that receives an inflator.

3. An air bag as set forth in claim 1, wherein said inner bag further comprises a plurality of vent openings between adjacent ones of said arm portions when said inner bag is in said folded condition, said vent openings being movable from a closed condition to an open condition in response to an increase in fluid pressure in said inner bag to enable flow of inflation fluid from said inner bag into said inflation fluid volume of said outer bag.

4. An air bag as set forth in claim 3 wherein said inner bag when in said folded condition has a plurality of corners, each of said vent openings being located at a respective one of said corners.

5. An air bag as set forth in claim 1 wherein said arm portions are folded at least partially over said central portion when said inner bag is in said folded condition.

6. An air bag as set forth in claim 1 wherein said inner bag further includes a retainer portion, said retainer portion of said inner bag comprising said outer end portions of said arm portions extending along said periphery of said inflation fluid opening of said inner bag, said fastener openings extending through said retainer portion.

7. An air bag as set forth in claim 6 wherein said arm portions are rectangular, said rectangular arm portions defining a rectangular configuration of said inflation fluid opening of said inner bag, said outer end portions of said rectangular arm portions defining said retainer portion.

8. An air bag as set forth in claim 7 further comprising a retainer plate for helping to retain said inner and outer bags, said retainer plate having a rectangular configuration overlying said retainer portion of said inner bag, said fasteners extending through fastener openings in said retainer plate and through said aligned fastener openings in said outer bag and said inner bag to secure said inner bag to said outer bag.

9. An air bag as set forth in claim 1 wherein said fasteners clamp said retainer portion of said inner bag to said retainer portion of said outer bag.

10. A vehicle air bag as set forth in claim 1, wherein each of said arm portions includes opposite first and second side edges extending from said central portion and a terminal end edge opposite said central portion, said end edge extending between said first and second side edges, each of said arm portions including a first corner portion defined adjacent the intersection of said end edge and said first side edge and a second corner portion defined adjacent the intersection of said end edge and said second side edge, said first and second corner portions being spaced radially and in an alternating fashion about said central portion such that each of said first corner portions is positioned radially adjacent a second corner portion of an adjacent arm portion, each of said first and second corner portions including one of said fastener openings, said radially adjacent first and second corner portions overlying each other and said fastener openings of said overlying first and second corner portions being aligned with each other when said inner bag is in said folded condition.

11. A vehicle air bag comprising:

an outer bag having an inflation fluid volume, said outer bag comprising a central inflation fluid opening and a plurality of fastener openings spaced around said inflation fluid opening;

an inner bag located in said inflation fluid volume of said outer bag, said inner bag being made from a single piece of flexible material comprising a central portion and a plurality of arm portions extending from said central portion, each of said arm portions including opposite first and second side edges extending from said central portion and a terminal end edge opposite said central portion, said end edge extending between said first and second side edges, each of said arm portions including a first corner portion defined adjacent the intersection of said end edge and said first side edge and a second corner portion defined adjacent the intersection of said end edge and said second side edge, each of said first and second corner portions including a fastener opening;

said inner bag having a folded condition wherein said arm portions are folded relative to said central portion such that only said first and second corner portions overlie each other and no more than two of said arm portions overlie each other at any location on said arm portions, said fastener openings of said overlying first and second corner portions being aligned with each other;

said arm portions defining an inflation fluid opening of said inner bag when said inner bag is in said folded condition, said inflation fluid opening having a periphery defined by said end edges of said arm portions, said inflation fluid opening of said inner bag overlying said inflation fluid opening of said outer bag, said fastener openings of said overlying first and second corner portions being aligned with a respective one of said fastener openings in said outer bag;

said air bag further comprising a plurality of fasteners extending through said aligned fastener openings in said outer bag and said inner bag to secure said inner bag to said outer bag.

12. An air bag as set forth in claim 11, wherein said arm portions define a plurality of vent openings between adjacent first and second side edges of said arm portions when said inner bag is in said folded condition, said vent openings being movable from a closed condition to an open condition in response to an increase in fluid pressure in said inner bag to enable flow of inflation fluid from said inner bag into said inflation fluid volume of said outer bag.

13. An air bag as set forth in claim 12 wherein said adjacent first and second side edges of said arm portions define corners of said inner bag when said inner bag is in said folded condition, each of said vent openings being located at a respective one of said corners of said inner bag.

14. An air bag as set forth in claim 12, wherein said single piece of material comprises four of said arm portions extending from said central portion, said single piece of material having a cross-shaped configuration.

15. An air bag as set forth in claim 14 wherein said inner bag when in said folded condition has four corners, each of said vent openings being located at a respective one of said corners.

16. An air bag as set forth in claim 11 wherein said arm portions are folded at least partially over said central portion when said inner bag is in said folded condition.

17. An air bag as set forth in claim 11 wherein said inner bag further includes a retainer portion, said retainer portion of said inner bag comprising outer end portions of said arm portions extending along said periphery of said inflation fluid opening of said inner bag.

18. An air bag as set forth in claim wherein each one of said outer end portions includes at least one of said fastener openings in said inner bag.

19. An air bag as set forth in claim 17 wherein said arm portions are rectangular, said rectangular arm portions defining a rectangular configuration of said inflation fluid opening of said inner bag, said outer end portions of said rectangular arm portions defining said retainer portion, said fastener openings extending through said retainer portion of said inner bag.

20. An air bag as set forth in claim 11 wherein each of said first side edges intersects an adjacent one of said second side edges of an adjacent arm portion.

21. A vehicle air bag as set forth in claim 11, wherein each of said arm portions includes opposite first and second side edges extending from said central portion and a terminal end edge opposite said central portion, said end edge extending between said first and second side edges, each of said arm portions including a first corner portion defined adjacent the intersection of said end edge and said first side edge and a second corner portion defined adjacent the intersection of said end edge and said second side edge, said first and second corner portions being spaced radially and in an alternating fashion about said central portion such that each of said first corner portions is positioned radially adjacent a second corner portion of an adjacent arm portion, each of said first and second corner portions including one of said fastener openings, said radially adjacent first and second corner portions overlying each other and said fastener openings of said overlying first and second corner portions being aligned with each other when said inner bag is in said folded condition.

\* \* \* \* \*

UNITED STATES PATENT AND TRADEMARK OFFICE
CERTIFICATE OF CORRECTION

PATENT NO. : 6,612,609 B1
DATED : September 2, 2003
INVENTOR(S) : Alberto Rodriquez and Hector Javier Zarazua Mauleon It is certified that error appears in the above-identified patent and that said Letters Patent is hereby corrected as shown below:

Column 5,
Line 63, after "claim" change "1" to -- 8 --.

Column 7,
Line 20, after "claim" insert -- 17 --.

Signed and Sealed this

Twelfth Day of October, 2004

JON W. DUDAS
*Director of the United States Patent and Trademark Office*